Patented Oct. 10, 1939

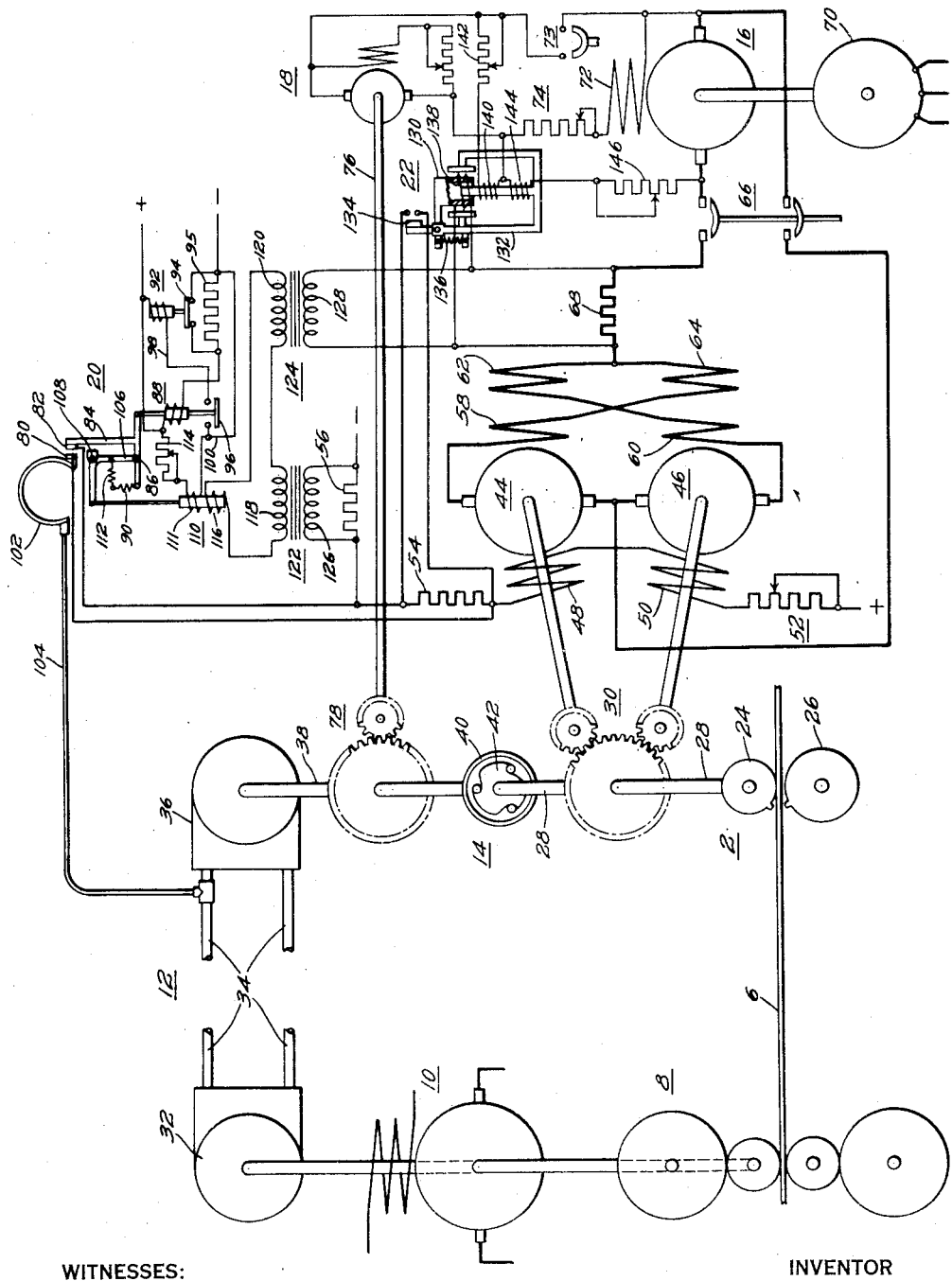

2,175,828

UNITED STATES PATENT OFFICE 2,175,828

SHEAR CONTROL SYSTEM

Willard G. Cook, Wilkinsburg, Pa., assignor to Westinghouse Electric & Manufacturing Company, East Pittsburgh, Pa., a corporation of Pennsylvania Application July 16, 1938, Serial No. 219,533

17 Claims. (Cl. 164—68)

My invention relates, generally, to shear control systems and, more particularly, to a control system for properly regulating the acceleration, speed and torque of the driving motors of a rotary flying shear.

In the production of steel sheets, the steel is passed through a rolling mill in the form of a strip to reduce it to the proper thickness. As the strip leaves the last roll stand of the mill, the leading end is cropped and the strip is cut into sheets of the desired lengths.

It is common practice to use a flying shear to cut steel strip into sheets as it is delivered from the mill, the shear being accelerated from standstill to crop the strip and driven at the speed necessary to cut the desired lengths of sheet from the strip. It is also common practice to regulate the speed of the flying shear in accordance with the speed of delivery of the strip, which is governed by the speed of the mill, by means of a hydraulic power transmitting system comprising a hydraulic pump driven by the mill motor and a hydraulic motor driven by the hydraulic pump and controlling the speed of rotation of the flying shear.

The flying shear is driven by motors and is connected to the hydraulic speed controlling motor by an over-running clutch which engages when the shear speed is equal to the hydraulic motor speed to prevent the shear speed from exceeding the speed necessary to cut the strip to the desired lengths. The output of the hydraulic pump may be varied to vary the speed of the hydraulic motor and to thus vary the length of the cut taken by the shear.

Such a system for operating a flying shear is shown and described in the patent to L. Iversen No. 2,085,981, dated July 6, 1937. It is common practice in the operation of such flying shear control systems to maintain torque against the hydraulic motor through the over-running clutch and to regulate this torque by maintaining a constant current input to the shear motors.

It will be readily apparent that maintaining a constant current input on the shear motors will not provide a contant torque on the hydraulic motor since the shear friction load varies with the speed and, at increased speeds, more of the motor torque will be used in overcoming the shear friction and less torque will be delivered to the hydraulic motor. The slip through the hydraulic transmission system varies with the back pressure applied to the system by the torque applied to the system by the shear motors through the over-running clutch. It, therefore, follows that variations in mill speed will result in variations in the ratio between the mill speed and the shear speed and this will result in variations in the lengths of the cuts taken by the shear.

The limitation of the shear motor current to provide constant motor torque has the additional disadvantage of limiting the acceleration rate of the shear motors. The shear motors are accelerated to full speed in response to a switching device which is actuated when the leading end of the strip reaches a predetermined point in the mill and the switching device is so located as to coordinate the movement of the leading end of the strip and the acceleration of the shear so that the strip will be cropped by the shear at the proper place. It is desirable that the acceleration rate be very high and that it not be limited by a constant current regulator.

In the operation of these shear control systems the output voltage of the main generator which supplies power to the shear motor or motors is changed by manual adjustment of its excitation whenever the mill speed is changed to thus properly regulate the shear motor speed.

It is an object of my invention to provide a control system for a rotary flying shear which shall function to cause the shear to make accurate cuts of lengths of strip material regardless of the speed at which the material is traveling.

Another object of the invention is to provide a control system for a rotary flying shear which shall function to maintain a substantially constant ratio between the speed of the shear and the speed of the strip material upon which the shear is to act.

A further object of the invention is to provide a control system for a motor driven rotary flying shear having a hydraulic synchronizing system which shall function to maintain a substantially constant back pressure on the hydraulic system at all speeds of the shear to thereby insure uniform cut lengths at all shear speeds.

A further object of the invention is to provide a control system for the driving motors of a rotary flying shear which shall function to automatically vary the speed and the rate of acceleration of the motors in accordance with variations in the rate of feed of the strip which is to be sheared.

Another object of the invention is to provide a control system for the driving motors of a rotary flying shear in a shear control system which has a motor driven shear and a synchronizing system between a strip mill and the flying shear including an over-running clutch, which shall function to control the acceleration rate of the shear driving motors to thus limit the shock on the synchronizing system when the shear reaches its running speed and the over-running clutch engages.

A further object of the invention is to provide a control system for the driving motors of a rotary flying shear which shall function to automatically control the rate of acceleration of the shear motors in accordance with the rate of feed of the strip to the shear.

Still another object of the invention is to provide a control system for the shear driving motors of a rotary flying shear having a hydraulic synchronizing system which shall function to control the torque of the shear driving motors in accordance with the back pressure generated in the hydraulic synchronizing system by the shear motors and which shall function to prevent hunting of the shear motors.

These and other objects and advantages of the invention will be apparent from the following detailed description taken in connection with the accompanying drawing in which the single figure is a diagrammatic view of the preferred embodiment of my control system showing the elements of the system and their cooperative relationships.

Referring to the drawing, a rotary flying shear 2 driven by a motor unit 4, which may comprise a pair of motors, acts to cut lengths of material from the strip 6 as it is delivered from the roll stand 8. The rolls of roll stand 8 are driven by a motor 10 and a hydraulic transmission system 12 is employed to provide a predetermined speed relation between the rolls of the roll stand 8 and the rotary shear 2. An over-running clutch 14 connects the hydraulic transmission system with the rotary shear 2 to provide a limiting control for the shear 2 only after the shear has been brought up to the desired speed.

The motors of the motor unit 4 may be supplied with power by a continuously driven main generator 16 which is excited by an exciter generator 18. A regulator 20 is provided for limiting the torque of the motor unit 4 and an acceleration relay 22 is provided for controlling the rate of acceleration of the motor unit 4, as will be explained more fully hereinafter.

The rotary shear 2 is of the usual construction and comprises rotors 24 and 26 having cooperating cutting elements driven through a shaft 28 and suitable gearing 30 by the motors of the motor unit 4.

The hydraulic transmission system 12 may be of the well known Waterbury type comprising a hydraulic pump or transmitting unit 32 driven by the roll stand motor 10 and connected by conduits 34 to a hydraulic motor or receiving unit 36. The receiving unit 36 is connected by shaft 38 to drive the driven element 40 of the over-running clutch 14. The driving element 42 of the over-running clutch 14 is connected to be driven by the motor unit 4 through shaft 28.

The hydraulic transmission system 12 will function to maintain an exact constant speed relation between its transmitting unit 32 and its receiving unit 36 so long as the back pressure in the system generated by the torque of the motors 44 and 46 on the receiving unit 36 through the over-running clutch 14 is constant. This speed relation between the transmitting and receiving units 32 and 36 may change slightly, however, when the pressure in the system changes since there is a certain amount of slip in the hydraulic transmission system which varies with the pressure in the system. It is, therefore, necessary that substantially constant torque be applied to the hydraulic system 12 by the motors 44 and 46 through the over-running clutch 14, so that this exact relationship between the speeds of the transmitting and receiving units 32 and 36 may be maintained and the length of the cuts taken by the shear 2 may not vary.

Thus the driven element 40 of the over-running clutch 14 is driven at a constant speed relation with the speed of the rolls of roll stand 8 and after the speed of the rotors of the rotating shear 2 has been brought up to the desired speed corresponding with the speed of the rolls of roll stand 8, the driving element 42 of the over-running clutch 14 will engage the driven element 40 to apply a back torque to the hydraulic transmission system 12 through the shaft 38 and the receiving unit 36.

The motor unit 4 comprises direct current motors 44 and 46 connected, as shown, to drive the rotary shear and the driving element 42 of the over-running clutch 14 through the gearing 30 and the shaft 28. Motors 44 and 46 have main field windings 48 and 50, respectively, connected to be energized from a source of direct current power indicated by the (+) and (—) signs in series circuit relation with a rheostat 52 and resistance elements 54 and 56. These motors are also provided with cumulative series fields 58 and 60, respectively, and with differential series fields 62 and 64, respectively, which are cross connected after the manner common in the art to provide the proper division of the load between the motors 44 and 46.

The armatures of motors 44 and 46 are connected in parallel circuit relation and may be connected by means of a suitable circuit breaker 66 to the generator 16 through a resistance element 68.

The generator 16 may be continuously driven by any suitable motor 70 and has a field winding 72 which may be connected by a suitable circuit breaker 73 to be energized by the exciter generator 18 in series circuit relation with a rheostat 74.

The exciter generator 18 which supplies the excitation current for the generator 16 is mechanically connected by shaft 76 and suitable gearing 78 to be driven by the shaft 38 and to, therefore, have a speed of rotation and consequently a voltage output proportional to the speed of rotation of the roll stand 8.

In order to control the amount of torque that the motor unit 4 will apply to the transmission system through the over-running clutch 14, the regulator 20 is provided and includes cooperating contact elements 80 and 82 which, when they engage, complete a shunting circuit for the resistance element 54 which is in series circuit relation with the main fields 48 and 50 of the motors 44 and 46. It will be seen that the completion of the shunting circuit for the resistance element 54 will increase the current flow in the field windings 48 and 50 and will thus tend to decrease the torque applied by the motors 44 and 46. The regulating device 20 will thus so control the motors 44 and 46 as to cause them to maintain a substantially constant torque on the transmission system 12 through the over-running clutch 14 to thus insure equal lengths of cut by the shear 2 by maintaining a constant pressure in the hydraulic transmission system 12 and thus maintaining a constant speed relation between the transmitting unit 32 and the receiving unit 36 of the hydraulic transmission system 12.

The contact element 81 of the regulator 82 is mounted on a bell crank 84 which has a pivot 86. The bell crank 84 is oscillated about the pivot 86 by a solenoid 88 which is intermittently energized and which acts in opposition to the bias of a spring member 90 connected to the bell crank 84 in such a manner as to urge the contact element 82 away from the contact element 80. A relay 92 having a contact element 94 normally in closed circuit position with a shunting circuit for a resistance element 95 may be connected to a source of energy indicated by the (+) and (—) signs through the contact element 96 of solenoid 88 and conductors 98 and 100. The winding of solenoid 88 is connected in series circuit relation with the resistance element 95 and the resistance element 95 has a resistance of such value as to limit the current flow in the coil of the solenoid 88 to such a value as will permit its core to be retracted by the spring element 90.

With these circuit relations it will be seen that the solenoid 88 will move its core against the bias of spring 90 until its contact element 96 closes to energize the relay 92. When relay 92 is energized, its contact element 94 will be opened to introduce the resistance element 95 in series circuit relation with the coil of solenoid 88 and this, in turn, will cause the core of solenoid 88 to be retracted and its contact element 96 to be opened. With the contact element 96 in open circuit position, the coil of relay 92 will again be deenergized and its contact element 94 will be closed to complete the shunting circuit for resistance element 95 and again increase the energization of solenoid 88, thus continuously repeating the cycle causing the core of solenoid 88 to be intermittently advanced and retracted and consequently effecting a continuous reciprocation of the contact element 82 toward and away from the contact element 80.

The continuous reciprocation of the contact element 82 toward and away from the contact element 80 will cause intermittent closing and opening of the shunting circuit for the resistance element 54 and an intermittent increasing and decreasing of the excitation of the motors 44 and 46. The resultant effect of this intermittent increase and decrease of the excitation of motors 44 and 46 will depend upon the relative periods of closed circuit condition and open circuit condition of the shunting circuit for the resistance element 54. The ratio between the closed circuit condition and the open circuit condition of the shunting element 54 will depend upon the position of the contact element 80 and the relation of the path of travel of the contact element 82 to the position of the contact element 80.

In order to provide the proper control of the motors 44 and 46 so that they will deliver a constant back pressure to the hydraulic transmission system 12, the contact element 80 is mounted to be actuated by any suitable pressure responsive device 102, here shown as a Bourdon tube type pressure responsive device connected by a suitable conduit 104 to one of the conduits 34 of the hydraulic transmission system 12. Thus, as the motors 44 and 46 tend to increase the torque on the transmission system 12, the pressure responsive device 102 will move the contact element 80 toward the contact element 82 and increase the intervals of contact between the contact elements 80 and 82. This will result in an increase in the ratio of the periods of increased excitation to the periods of decreased excitation for the motors 44 and 46, thus tending to decrease the torque applied by the motors 44 and 46 to the transmission system 12 through the over-running clutch 14.

In order to prevent hunting of the motors 44 and 46 due to excessive increases and decreases of the torque delivered to the hydraulic transmission system, the regulator 20 is provided with anticipating circuit control means for preventing too great a change in the excitation of the motors 44 and 46 in response to changes in the pressure in the transmission system 12. This anticipating circuit control means includes a bell crank 106 supporting the pivot 86 for the bell crank 84 on which contact element 82 is mounted, and having a pivot 108. A solenoid 110 is provided for applying a rotational force to the bell crank 106 against the bias of a spring element 112. The coil 111 of the solenoid 110 is connected through a rheostat 114 to the source of energy indicated by the (+) and (—) signs and has a constant energization controlled by the rheostat 114 which tends to position the pivot 86 in any desired normal position.

The solenoid 110 also has a winding 116 which is connected in series circuit relation with the secondary windings 118 and 120 of transformers 122 and 124, respectively, and produces a flux which may add to or subtract from the flux produced by the solenoid winding 111, depending upon the direction of current flow in the winding 116. The transformer 122 has a primary winding 126 which is connected in shunt circuit relation with the resistance element 56. With this circuit connection it will be seen that any change in the current flow in the field windings 48 and 50 of the motors 44 and 46 will cause a change in the energization of the primary winding 126 and this will produce an impulse in the secondary winding 118. This impulse will flow through the solenoid winding 116 to either increase or decrease the pull of the solenoid 110 upon the bell crank 106, depending upon the polarity of the impulse acting upon the winding 116 which, in turn, is dependent upon whether the impulse was caused by an increase or a decrease in the current flow in the field windings 48 and 50.

The transformer 124 has a primary winding 128 which is connected in shunt circuit relation with a resistance element 68, so that the current flow in the primary winding 128 will be dependent upon the armature current of the motors 44 and 46. When the armature current of motors 44 and 46 either increases or decreases, the increase or decrease in current flow in the primary winding 128 will cause an impulse to be induced in the secondary winding 120, the polarity and potential of which will depend upon the amount of change in the armature current of the motors 44 and 46 and upon whether the change in armature current has been an increase or a decrease. The impulse induced in the secondary winding 120 will effect current flow in the winding 116, the torque of which depends upon the polarity of the impulse and this will effect the pull of the core of the solenoid 110 upon the bell crank 106 to change the positioning of the pivot 86 of bell crank 84.

The relation of the windings 118, 120 and 116 is such as to effect such a movement of the path of travel of the contact element 82 as will tend to decrease the correcting effect on the excitation of the motors 44 and 46 which has been initiated by the movement of the contact element 80 under influence of the pressure responsive device 102 either toward or away from the contact element 82. As an instance of the operation of this anticipating system, let us suppose that the torque on the hydraulic system 12 has increased above the normal desired amount. This increase in torque will increase the pressure in the hydraulic transmission system 12 and this will effect a movement of the contact element 80 to the right. The movement of the contact 80 to the right will cause the ratio of the period of engagement to the period of disengagement of the contact elements 80 and 82 to increase, thus increasing the current flow in the field windings 48 and 50 of the motors 44 and 46. This increase in the excitation current of the motors 44 and 46 will cause an impulse to be generated in the secondary winding 118 of transformer 122 as hereinbefore described. As the excitation of the motors 44 and 46 increases, the current flow in their armatures will decrease and this will cause an impulse to be generated in the secondary winding 120 of the transformer 124, as hereinbefore described. The impulses generated in the windings 118 and 120 will be in such a direction as to cause the flux produced by the winding 116 to add to the flux produced by the winding 111 of solenoid 110, thus increasing the displacement of the bell crank 106 around its pivot 108 against the biasing force of the spring 112 and moving the path of travel of the contact element 82 further away from the contact element 80. This decreases the correcting effect that the increased pressure in the hydraulic transmission system 12 has initiated by moving the contact element 80 toward the path of travel of the contact element 82 by means of the pressure responsive device 102.

In a like manner, when the regulator 20 functions in response to decreased pressure to increase the pressure in the hydraulic system 12 by changing the excitation of the motors 44 and 46 in response to the pressure responsive device 102, the anticipating circuit will function to shift the path of movement of the contact element 82 toward the contact element 80 to prevent too great or too sudden changes in the pressure of the hydraulic system 12.

The acceleration relay 22 includes an armature 130 which is pivoted on a core 132 and which functions to move a contact element 134 toward closed circuit position against the bias of a spring element 136. The contact element 134 when in closed circuit position completes a shunting circuit for the resistance element 54 which increases the current flow in the field windings 48 and 50 of the motors 44 and 46 to thus increase their excitation. Since the increase in the excitation of the motors 44 and 46 will cause a decrease in the current flow in the armatures of these motors, the movement of the contact element 134 to closed circuit position will decrease the acceleration of the motors 44 and 46.

The armature 130 of the acceleration relay 22 has a winding 138 mounted thereon and movable therewith which is connected in shunt circuit relation with the resistance element 68 and is, therefore, energized in accordance with the amount of current flow in the armatures of the motors 44 and 46. The center leg of the core 132 has supported thereon a winding 140 which is connected to be energized in accordance with the potential of the exciter generator 18 in series circuit relation with a rheostat 142. The center leg of the core 132 also supports a winding 144 which is connected to produce a flux in opposition to the flux produced by the winding 140 and which is connected through a rheostat 146 to be energized in accordance with the difference between the potential of the exciter generator 18 and the potential of the generator 16.

The rheostats 142 and 146 may be so adjusted as to provide the desired proportions of current flow in the windings 140 and 144 to produce the desired operation of the acceleration relay 22. In the operation of the system to accelerate the motors 44 and 46 to the desired speed, the generator 16 is connected to the armatures of the motors by means of any suitable circuit breaker 66 and the circuit breaker 73 is closed to provide excitation for the generator 16. Then the potential applied to the armatures of the motors 44 and 46 is increased by operating the rheostat 74 to increase the excitation of the generator 16, thus increasing its output potential. The output potential of the generator 18 is substantially constant. Thus it is apparent that the energization of the winding 144 varies from a fairly high value to a very low value while the potential output of the generator 16 is being increased and meanwhile the energization of the winding 140 remains substantially constant. This increases the effective flux in the core 132 from a low value to a high value as the potential applied to the motors 44 and 46 by the generator 16 is being increased to accelerate the motors. While the motors 44 and 46 are accelerating their armature current will decrease because of their increased back E. M. F. due to their increased speed of rotation as they accelerate.

It will be seen then that the contact element 134 is under control of opposing forces, one of which, the effect of winding 138 on armature 130, is continuously decreasing and the other of which, the resultant effect of the fluxes produced by the windings 140 and 144, is continuously increasing as the motors are accelerated. When the product of these forces exceeds a predetermined amount, the contact element 134 will be moved to circuit closing position to increase the excitation of the motors 44 and 46, and to thus decrease their armature currents and decrease the accelerating forces upon them. As their armature currents decrease, the current flow in the coil 138 will decrease and the contact element 134 will be moved to open circuit position by the spring element 136. As the output potential of the generator 16 approaches the normal operating value, the accelerating relay 22 will become more effective to limit the accelerating forces on the motors 44 and 46 so that the motors will be prevented from suddenly attempting to increase their speed beyond their desired normal operating speed and thus the shock on the hydraulic transmission system 12 and its associated mechanisms caused by too sudden engagement of the over-running clutch 14 by excessive acceleration of the motors 44 and 46 will be prevented.

It will be seen that the connections hereinbefore described will also operate to effect increased rates of acceleration of the motors 44 and 46 with increased speeds of the mill 8. This effect is brought about by the increased output potential of the exciter generator 18 whose speed varies with the speed of the rolls of the mill 8 which, in turn, causes an increased output potential of the generator 16 and, therefore, increased potential applied to the armature of motors 44 and 46. This increase in the potential outputs of the generators 16 and 18 also has the compensating effect on the acceleration relay 22 which will cause the relay 22 to permit increased accelerating forces on the motors 44 and 46.

In the operation of the shear control system, with the rolls of roll stand 8 rotating at their normal speed, the hydraulic transmission system 12 will be rotating the driven element 40 of the over-running clutch 14 at the speed at which it is necessary for the rolls of the rotary shear 2 to rotate in order to take the desired lengths of cut of strip as it is fed through the mill. Under these conditions the exciter generator 18 will have a potential output which is proportional to the speed of the rolls of the roll stand 8. If now a length of strip is sent through the mill, suitable control devices will operate the circuit breakers 66 and 73 to move them to closed circuit position and the rheostat 74 will be operated to increase the output potential of the generator 16 to accelerate the motors 44 and 46. This operation of the circuit breakers 66 and 73 to excite the generator 16 and to connect the generator 16 with the armatures of the motors 44 and 46 may be effected in any suitable manner commonly in use in the art, such as by flag switches or light responsive cell circuits which will be actuated by the forward end of the strip as it reaches a predetermined position in the mill. The increasing of the excitation of the generator 16 to quickly increase its output potential and thus quickly increase the accelerating force on the motors 44 and 46, will quickly accelerate the motors 44 and 46, this acceleration being controlled, however, by the acceleration relay 22, as hereinbefore described, to limit the rate of acceleration of the motors 44 and 46, particularly as the motors approach the normal running speed which will produce a speed of rotation of the driving element 42 of the over-running clutch 14 substantially equal to the speed of the driven element 40 of the over-running clutch 14.

The characteristics of the accelerating relay 22 and the characteristics of excitation of the motors 44 and 46 may be adjusted by proper adjustment of the rheostats in the circuits of these elements hereinbefore described in detail to cause the rotary shear 2 to come up to its full speed in time to crop the leading end of the strip 6. Thereafter the rotary shear 2 will be driven at a speed which is necessary to cut equal lengths of strip under control of the hydraulic transmission system 12 as hereinbefore described. In order to insure that these lengths of strip be of equal length, the regulator 20 will so govern the torque applied by the motors 44 and 46 through the over-running clutch 14 to the hydraulic transmission system 12 as to maintain a substantially constant back pressure in the hydraulic system 12, thus resulting in a constant slip in the hydraulic system and a constant speed relation between the rolls of roll stand 8 and the rolls of the rotary shear 2. This regulation of the motors 44 and 46 by the regulator 20 will be produced in the manner hereinbefore described in detail in connection with the description of the method of operation of the regulator 20.

The setting of the acceleration relay 22 will be such as to prevent it from responding unless the armature currents of the motors 44 and 46 are considerably above their normal value, thus permitting the regulator 20 to exercise complete control of these motors in response to the pressure in the hydraulic transmission system 12 as soon as they have reached their full normal running speed and are applying a back pressure to the hydraulic transmission system 12.

In the event of a change in the speed of the rolls of the mill stand 8, the system will still operate to maintain a substantially constant back pressure on the hydraulic transmission system 12 to maintain a constant length of cut regardless of the speed of delivery of the strip to the shear. The change in speed of the rotary shear 2 in response to the change in speed of the rolls of roll stand 8 will be effected through a change in the excitation of the generator 16 in response to a change in the speed of rotation of the armature of the exciter generator 18 which provides the excitation for the generator 16. Thus the armature current of the motors 44 and 46 will vary in response to variations in the speed of the rolls of the roll stand 8 to provide the necessary variations in speed of these motors to maintain the constant speed relation between the rotary shear 2 and the rolls of roll stand 8.

It will be seen that I have provided a control system for a rotary flying shear which will function to maintain a constant predetermined speed relation between the rolls of the rotary shear and the rolls of the roll stand from which the strip to be sheared is fed to the shear regardless of the changes in speed of the rolls of the roll stand and, consequently, changes in the rate of delivery of the strip to the rotary shear, and which will function to provide a high rate of acceleration for the rotary shear, which will so control this rate of acceleration as to prevent excessive shock to the synchronizing system which connects the rolls of the roll stand with the rotary shear, and which will be simple and efficient in operation and inexpensive to manufacture, install and maintain in operation.

In compliance with the requirements of the patent statutes, I have shown and described herein a preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In a control system for a rotary flying shear, a work device from which the material to be sheared is delivered to the shear, an electric motor for driving the shear, a generator for energizing said motor, and an exciter for said generator driven by the work device so that its speed will vary with the work device speed.

2. In a flying shear control system, a rotary flying shear, a work device from which the material to be sheared is delivered to the flying shear at a speed dependent upon the speed of the work device, a motor for driving said shear, a hydraulic transmission system for controlling the speed of said shear comprising a hydraulic transmitter unit connected to be driven by said work device, a hydraulic receiver unit, means connecting said shear in driving relation with said hydraulic receiver unit, and means for maintaining a substantially constant value of torque applied to said hydraulic receiver unit through said shear comprising means responsive to the fluid pressure in said hydraulic transmission system for controlling the excitation of said motor.

3. In a flying shear control system, a rotary flying shear, means for driving said shear, a work device from which the material to be sheared is delivered to the shear at a speed dependent upon the speed of the work device, a hydraulic transmission system for controlling the speed of said shear comprising a hydraulic transmitter unit connected to be driven by said work device, a hydraulic receiver unit, means connecting said shear in driving relation with said hydraulic receiver unit, and means for maintaining a substantially constant value of torque applied to said hydraulic receiver unit through said shear regardless of variations in the speed of said work device.

4. In a control system for a flying shear, a motor for driving the shear, a variable voltage generator for energizing said motor, and means responsive to the voltage of said generator and the load on said motor for controlling the acceleration of said motor.

5. In a control system for a flying shear, a motor for driving the shear, a generator for supplying power to said motor, means for varying the voltage of said generator to accelerate said motor, and means responsive to the voltage of said generator and the load current of the motor for regulating the rate of acceleration of said motor.

6. In a flying shear control system, a motor for driving the shear, a generator for supplying power to said motor, means for varying the voltage of said generator to accelerate said motor, a relay having two fixed windings connected in opposing relation, means connecting one of said fixed windings to be energized in accordance with the difference between a substantially constant voltage and the voltage of said generator, means providing a substantially constant energization for the other of said fixed windings, said relay also comprising a movable winding energized in accordance with the load current of said motor, and means responsive to the operation of said relay for controlling the acceleration of said motor.

7. In a motor control system, a motor, a generator for supplying power to said motor, means for varying the voltage of said generator to accelerate said motor, a relay having a single winding and a composite winding, means mounting said single and composite windings for relative movement and for reaction with each other, means for energizing said single winding in accordance with the load current of said motor, said composite winding comprising a first winding and a second winding connected in opposed relation, means providing a substantially constant energization for said first winding, means for energizing said second winding in accordance with the difference between a predetermined substantially constant voltage and the voltage of said generator, and means responsive to said relay for controlling the excitation of said motor to thereby control its rate of acceleration.

8. In a shear control system, a rotary shear, a pair of feed rolls from which a strip of material which is to be acted upon by the shear is fed to the shear, an over-running clutch comprising a driving member and a driven member, means including a hydraulic transmission system for maintaining a predetermined speed relation between said feed rolls and said driven clutch member, a motor for driving said rotary shear, means whereby said driving clutch member is driven by said motor, and means for so controlling the operation of said motor as to cause it to maintain a substantially constant back pressure in said hydraulic transmission system.

9. In a shear control system, a rotary shear, a pair of feed rolls from which a strip of material which is to be acted upon by said shear is fed to the shear, an over-running clutch comprising a driving member and a driven member, means including a hydraulic transmission system for maintaining a predetermined speed relation between said feed rolls and said driven clutch member, a motor for driving said rotary shear, means whereby said driving clutch member is driven by said motor, a generator for supplying power to said motor, and means for varying the potential of said generator in accordance with variations in the speed of rotation of said feed rolls.

10. In a shear control system, a rotary shear, a pair of feed rolls from which a strip of material which is to be acted upon by the shear is fed to the shear, an over-running clutch comprising a driving member and a driven member, means including a hydraulic transmission system for maintaining a predetermined speed relation between said feed rolls and said driven clutch member, a motor for driving said rotary shear, means whereby said driving clutch member is driven by said motor, and means for so controlling the excitation of said motor as to cause it to maintain a substantially constant back pressure in said hydraulic transmission system, said means for controlling the excitation of said motor comprising a pressure responsive device connected to be actuated in accordance with the hydraulic pressure in said hydraulic transmission system and a vibrating regulator responsive to the pressure responsive device for controlling the excitation of said motor.

11. In a shear control system, a rotary shear, a par of feed rolls from which a strip of material which is to be acted upon by said shear is fed to the shear, an over-running clutch comprising a driving member and a driven member, means for maintaining a predetermined speed relation between said feed rolls and said driven clutch member, a motor for driving said rotary shear, a generator for supplying power to said motor, means for varying the voltage of said generator to accelerate said motor, and means responsive to the voltage of said generator and the load current of the motor for regulating the rate of acceleration of said motor.

12. In a shear control system, a rotary shear, a pair of feed rolls from which a strip of material which is to be acted upon by said shear is fed to the shear, an over-running clutch comprising a driving member and a driven member, means for maintaining a predetermined speed relation between said feed rolls and said driven clutch member, a motor for driving said rotary shear, a generator for supplying power to said motor, means for varying the voltage of said generator to accelerate said motor, a relay having a single winding and a composite winding, means mounting said single and composite windings for relative movement and for reaction with each other, means for energizing said single winding in accordance with the load current of said motor, said composite winding comprising a fist winding and a second winding connected in opposed relation, means providing a substantially constant energization for said first winding, means for energizing said second winding in accordance with the difference between a predetermined substantially constant voltage and the voltage of said generator, and means responsive to said relay for controlling the excitation of said motor to thereby control its rate of acceleration.

13. In a shear control system, a rotary shear, a pair of feed rolls from which a strip of material which is to be acted upon by the shear is fed to the shear, an over-running clutch comprising a driving member and a driven member, means including a hydraulic transmission system for maintaining a predetermined speed relation between said feed rolls and said driven clutch member, a motor for driving said rotary shear, means whereby said driving clutch member is driven by said motor, means for so controlling the excitation of said motor as to cause it to maintain a substantially constant back pressure in said hydraulic transmission system, a generator for supplying power to said motor, means for varying the voltage of said generator to accelerate said motor, and means responsive to the voltage of said generator and the current flow in the armature of said motor for regulating its rate of acceleration.

14. In a shear control system, a rotary shear, a pair of feed rolls from which a strip of material which is to be acted upon by said shear is fed to the shear, an over-running clutch comprising a driving member and a driven member, means including a hydraulic transmission system for maintaining a predetermined speed relation between said feed rolls and said driven clutch member, a motor for driving said rotary shear, means whereby said driving clutch member is driven by said motor, means for so controlling the excitation of said motor as to cause it to maintain a substantially constant back pressure in said hydraulic transmission system through said over-running clutch, a main generator for energizing the armature of said motor, an exciter generator, means for varying the voltage of said exciter generator in accordance with the variations in the speed of said feed rolls, means connecting said exciter generator to supply excitation to the main generator, means for varying the voltage of said main generator to accelerate said motor, a relay having a single winding and a cmposite winding, means mounting said single and composite windings for relative movement and for reaction with each other, means for energizing said single winding in accordance with the current flow in the armature of said motor, said composite winding comprising a first winding and a second winding connected in opposed relation, means for energizing said first winding from said exciter generator, means for energizing said second winding with the difference of the ouput potentials of said main and exciter generators, and means responsive to said relay for controlling the excitation of said motor to thereby control its rate of acceleration.

15. In a shear control system, a rotary shear, a pair of feed rolls from which a strip of material which is to be acted upon by the shear is fed thereto, an over-running clutch comprising a driving member and a driven member, means including a hydraulic transmission system for maintaining a predetermined speed relation between said fed rolls and said driven clutch member, a motor for driving said rotary shear, means whereby said driving clutch member is driven by said motor, and means for so controlling the excitation of said motor as to cause it to maintain a substantially constant back pressure in said hydraulic transmission system, said means for controlling the excitation of said motor comprising a pressure responsive device connected to be actuated in accordance with the pressure in said hydraulic transmission system, a first movable contact element actuated by said pressure responsive device, a second movable contact element, means for continuously reciprocating said second contact element toward and away from said first contact element in substantially the line of motion of said first contact element, and means responsive to variations in the current flow in the armature and field windings of said motor for varying the relative positions of said first and second contact elements.

16. In a control system for a rotary flying shear, a work device from which the material to be sheared is delivered to the shear, an electric motor for driving the shear, a generator for energizing said motor, an exciter for said generator, and means for varying the excitation of said generator by said exciter in accordance with variations in the speed of said work device.

17. In a control system for a rotary flying shear, a work device from which the material to be sheared is delivered to the shear, driving means for said work device, an electric motor for driving the shear, means for energizing said motor independently of the work device driving means, and means for varying the energization of said motor in accordance with variations in the speed of said work device.

WILLARD G. COOK.